(12) United States Patent
Kim et al.

(10) Patent No.: US 10,954,345 B2
(45) Date of Patent: Mar. 23, 2021

(54) METHOD OF PREPARING MONODISPERSED POLYMER POLYOLS

(71) Applicant: Korea Kumho Petrochemical Co., Ltd., Seoul (KR)

(72) Inventors: Gi Jung Kim, Pyeongtaek-si (KR); Seul Gi Kim, Seongnam-si (KR); Seung Moo Huh, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 15 days.

(21) Appl. No.: 16/291,523

(22) Filed: Mar. 4, 2019

(65) Prior Publication Data

US 2019/0270853 A1 Sep. 5, 2019

(30) Foreign Application Priority Data

Mar. 2, 2018 (KR) ........................ 10-2018-0025250

(51) Int. Cl.
| | |
|---|---|
| *C08F 283/06* | (2006.01) |
| *C08G 18/63* | (2006.01) |
| *C08G 81/02* | (2006.01) |
| *C08G 101/00* | (2006.01) |

(52) U.S. Cl.
CPC .......... *C08G 81/025* (2013.01); *C08F 283/06* (2013.01); *C08G 18/632* (2013.01); *C08G 2101/00* (2013.01)

(58) Field of Classification Search
None
See application file for complete search history.

(56) References Cited

U.S. PATENT DOCUMENTS

| | | | | |
|---|---|---|---|---|
| 3,058,940 A | * | 10/1962 | Rees | C08F 283/06 524/832 |
| 3,347,811 A | * | 10/1967 | Bissot | C08J 3/07 524/563 |
| 3,383,351 A | * | 5/1968 | Stamberger | C08G 18/632 524/762 |

FOREIGN PATENT DOCUMENTS

JP 52045694 * 4/1977

* cited by examiner

*Primary Examiner* — David J Buttner
(74) *Attorney, Agent, or Firm* — Novick, Kim & Lee, PLLC; Jae Youn Kim

(57) ABSTRACT

Provided is a method of preparing a polymer polyol including steps of (a) respectively batchwise feeding a polyol and a monomer in a weight ratio of 40 to 60:40 to 60 into a reactor to prepare a mixture; and (b) polymerizing the mixture for 1 to 5 hours to prepare monodispersed particles.

7 Claims, 2 Drawing Sheets

METHOD OF PREPARING MONODISPERSED POLYMER POLYOLS

CROSS-REFERENCE TO RELATED APPLICATION

This application claims priority to and the benefit of Korean Patent Application No. 10-2018-0025250, filed on Mar. 2, 2018, the disclosure of which is incorporated herein by reference in its entirety.

BACKGROUND

1. Field of the Invention

The present invention relates to a method of preparing a polymer polyol, and more specifically, to a method of preparing mono-dispersed polymer polyols through homopolymerization of styrene.

2. Discussion of Related Art

A polymer polyol (POP), also called copolymer polyol (CPP), is generally used to enhance the hardness and air permeability of polyurethane. Recently, as the amount of polyurethane used in automobile seats, furniture and the like increases, the need for a method of preparing a polymer polyol with high quality at low production cost is growing as well.

According to an existing method of preparing a polymer polyol, a styrene monomer (SM) and acrylonitrile (AN) are mixed with a predetermined amount of a base polyol, and the mixture is continuously fed at a constant rate into a reactor in which the remaining base polyol is filled while a polymerization temperature is maintained to be polymerized, and thereby poly-dispersed SAN particles in which the styrene monomer and acrylonitrile are copolymerized are dispersed in the base polyol. The above-described method of continuously feeding monomers has an advantage of effectively dispersing the heat of polymerization, which is frequently generated in the polymerization of acrylonitrile, but also has a disadvantage in that the particle size of formed polymer particles is not uniform due to a preparation method in which monomers are fed during the polymerization, and a chain transfer agent or an organic diluent should be used in order to address the phenomenon of rapid change in viscosity occurring during continuous feeding of monomers. The chain transfer agent and organic diluent cause the occurrence of VOCs and odor in a product.

The polymerization stabilizer used in the production of a polymer polyol is a macromonomer containing a reactive unsaturated group capable of being copolymerized with a polymerizable monomer at a polyol end, which serves to improve the steric stability of produced particles by forming a graft copolymer during polymerization. However, since the styrene monomer has low graft efficiency with a polymerization stabilizer, the quality of a polymer polyol deteriorates due to problems such as a high viscosity due to a decrease in steric stability and an increase in the amount of soluble oligomers produced when the styrene monomer is used alone. To solve this problem, acrylonitrile, which has a relatively high graft efficiency and can be copolymerized with the styrene monomer to reduce the amount of produced soluble oligomers, is used, but the acrylonitrile causes a rise in the production costs of a polymer polyol.

Accordingly, there is the need for a technique of preparing a polymer polyol capable of resolving the problems of the prior art such as the use of the chain transfer agent and organic diluent, and the polydispersity of particles dispersed in the base polyol. At the same time, there is the need for a technique of preparing a polymer polyol capable of reducing the amount of produced soluble oligomers by maintaining the stability of polymer while maintaining the quality of an existing product.

SUMMARY OF THE INVENTION

The present invention has been made to solve the above-described problems of the prior art, and an objective of the present invention is to provide a method of preparing a polymer polyol in which polystyrene is monodispersed by applying a one pot polymerization process.

Another objective of the present invention is to provide a method of preparing a polymer polyol which does not deteriorate product quality even when styrene is used alone.

An aspect of the present invention provides a method of preparing a polymer polyol including steps of (a) respectively batchwise feeding a polyol and a monomer in a weight ratio of 40 to 60:40 to 60 into a reactor to prepare a mixture; and (b) polymerizing the mixture for 1 to 5 hours to prepare monodispersed particles.

In an embodiment, the polyol may be a polyether polyol.

In an embodiment, the polyether polyol may have a weight average molecular weight of 1,000 to 6,000 g/mol.

In an embodiment, the polyether polyol may have a hydroxyl value of 30 to 60 mgKOH/g.

In an embodiment, a surfactant may be further mixed and dispersed to convert the mixture into a water-in-oil type emulsion in step (a).

In an embodiment, the surfactant may be a cationic, anionic or nonionic surfactant.

In an embodiment, a solvent may be further mixed to disperse the mixture in the solvent in step (a).

In an embodiment, the solvent may be one selected from the group consisting of toluene, tetrahydrofuran, chloroform, cyclohexane, dioxane, dimethyl sulfoxide, dimethylformamide, acetone, acetonitrile, n-butanol, n-pentanol, chlorobenzene, ethylbenzene, dichloromethane, diethyl ether, tert-butanol, 1,2,-dichloroethylene, diisopropyl ether, ethanol, ethyl acetate, ethyl methyl ketone, heptane, hexane, isopropyl alcohol, isoamyl alcohol, methanol, pentane, n-propyl alcohol, pentachloroethane, 1,1,2,2-tetrachloroethane, 1,1,1-trichloroethane, tetrachlorethylene, tetrachloromethane, trichlorethylene, water, xylene, benzene, nitromethane, and combinations of two or more thereof.

In an embodiment, the monomer may be one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl) styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl) dimethylaminoethyl ether, vinylpyridine, vinyl xylene, diphenylethylene, diphenylethylene including tertiary amines, styrene including primary, secondary, or tertiary amines, derivatives thereof and combinations of two or more thereof.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
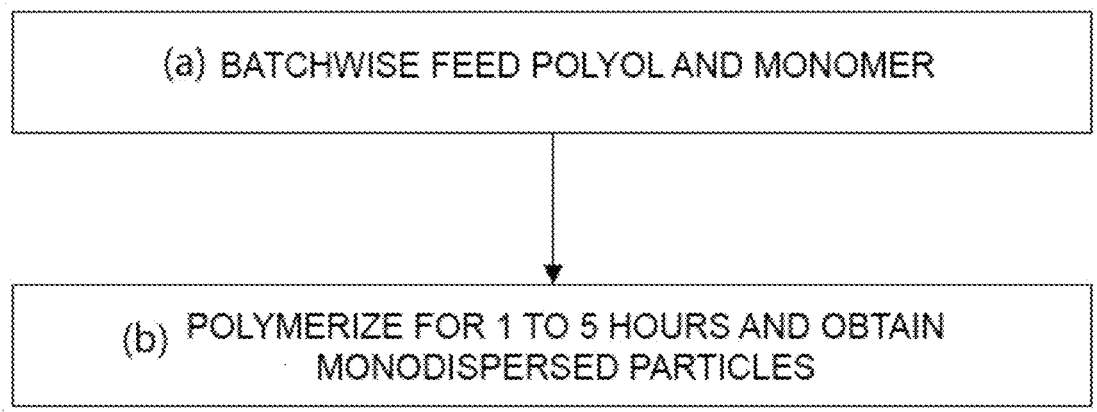
FIG. 1 illustrates a method of preparing a polymer polyol according to an aspect of the present invention.

Reference will now be made in detail to various embodiments of the present invention, examples of which are illustrated in the accompanying drawings and described below, so that a person having ordinary skill in the art to which the present invention relates can easily put the present invention into practice. The present invention, however, can be embodied in various different forms and is not limited to embodiments which will be described hereinafter. In addition, those parts which are not related to the description are omitted from the accompanying drawings in order to more clearly describe the present invention, and the same reference numerals and symbols are used throughout the specification in order to designate the same or similar components.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, unless explicitly stated to the contrary, the term "include," "includes" or "including" used throughout the specification will be understood as including the possibility of the presence or addition of other elements and not excluding the other elements.

In the present invention, a "polymer polyol (POP)" is also referred to as a copolymer polyol (CPP), which is a product in which a predetermined content of a particulate organic or inorganic filler is dispersed in a base polyol in a liquid phase. A polyol prepared by dispersing and polymerizing an acrylic monomer in a polyether polyol is also a type of the polymer polyol. It is widely used in various fields such as seats, bedding, automobile parts and the like for the purpose of increasing the hardness and air permeability of soft and semi-rigid polyurethane foam.

A "soluble oligomer" is a low molecular weight polymer produced by polymerization between some unreacted monomers, which causes degradation of the quality of polyurethane foam. For example, soluble oligomers may refer to dimers, trimers or tetramers.

"Polyurethane" is a polymer material having a large amount of urethane (—NHCOO) bonds, and is generally formed and processed into the form of foam, which is a honeycomb-shaped light material, through a polymer reaction generating bubbles and used. A "polyurethane foam" is usually classified as a flexible, rigid, and semi-rigid polyurethane foam.

"Dispersion polymerization" is one of the polymerization methods of polymers, in which a solvent which solubilizes a monomer but does not solubilize a resulting polymer, a polymerization stabilizer and a polymerization initiator are used so that all constituents are dissolved in a single phase at the initial stage of the reaction, but as polymerization proceeds, the resulting polymer is precipitated, and a product having a particle diameter of several hundred nanometers to several tens of microns is obtained by the polymerization stabilizer.

"Mono-disperse" refers to a case where individual dispersoid particles in a dispersion system have a uniform size. A polymer obtained by a common method has a poly-disperse system having a molecular weight distribution. On the other hand, a system in which there is no substantial molecular weight distribution is referred to as a mono-disperse system. There are methods such as directly obtaining a system similar to the mono-disperse system by living polymerization, and converting a poly-disperse system to a system similar to the mono-disperse system by fraction.

"Water-in-oil" refers to a dispersion in which water in the form of fine particles is dispersed in oil, but as necessary, it may be interpreted as a concept including a dispersion in which a polar material in the form of fine particles is dispersed in a non-polar material.

Hereinafter, embodiments of the present invention will be described in detail with reference to the accompanying drawings.

FIG. 1 illustrates a method of preparing a polymer polyol according to an aspect of the present invention. Referring to FIG. 1, a method of preparing a polymer polyol according to an aspect of the present invention may include steps of (a) respectively batchwise feeding a polyol and a monomer in a weight ratio of 40 to 60:40 to 60 into a reactor to prepare a mixture; and (b) polymerizing the mixture for 1 to 5 hours to prepare monodispersed particles.

In step (a), the mixture may be prepared by respectively batchwise feeding the polyol and the monomer in a weight ratio of 40 to 60:40 to 60 into the reactor. When the weight ratio of the polyol to the monomer is less than 40, the solid content of the polymer polyol may increase to cause aggregation. When the weight ratio of the polyol to the monomer is more than 60, the hardness of the polyurethane foam produced from the polymer polyol may be lowered.

The polyol may be a polyether polyol, and the polyether polyol may have a weight average molecular weight of 1,000 to 6,000 g/mol. When the weight average molecular weight of the polyether polyol is less than 1,000 g/mol, the hardness of the polyurethane foam produced from the polymer polyol may be lowered. When the weight average molecular weight is more than 6,000 g/mol, the viscosity of the prepared polymer polyol may be excessively increased, and thus processability may be lowered.

The polyether polyol may have a hydroxyl value of 30 to 60 mgKOH/g. A hydroxyl value (OHV) is the weight of potassium hydroxide required to neutralize acetic acid bound to an acetyl compound obtained from 1 g of polyol, and the unit thereof is mgKOH/g. The hydroxyl value represents a hydroxyl group content in a polyol, which may determine the ratio of the polyol during the polymerization of polyurethane.

The polyether polyol may have a viscosity of 150 to 700 cps. When the viscosity is less than 150 cps, the mechanical properties and durability of polyurethane foam may deteriorate. When the viscosity is more than 700 cps, the viscosity of polyurethane may excessively increase, and thus processability may be lowered. The viscosity described in the present specification refers to a viscosity measured at 25° C. unless otherwise noted.

The monomer may be one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl) dimethylaminoethyl ether, vinylpyridine, vinyl xylene, diphenylethylene, diphenylethylene including tertiary amines, styrene including primary, secondary, or tertiary amines, derivatives thereof and combinations of two or more thereof, and preferably, may be styrene, but is not limited thereto.

An existing method of preparing a polymer polyol has problems such as aggregation, production of soluble oligomers and deterioration in product quality when styrene is used alone, but in the preparation method of the present invention, a polymer polyol with excellent quality may be prepared even when styrene is used alone.

In step (b), the mixture obtained in step (a) may be subjected to one-pot polymerization for 1 to 5 hours to obtain mono-dispersed particles economically and efficiently without using any other diluents or chain transfer agents as in the prior art. When the polymerization time is less than 1 hour in step (b), it is difficult to obtain the required yield. When the polymerization time exceeds 5 hours, reaction efficiency may be lowered. The temperature required for the polymerization may be 100 to 150° C., preferably 110 to 130° C., and more preferably 120 to 125° C.

Step (b) may include step (b1) of forming a polymer by reaction of the monomer contained in the mixture and step (b2) of allowing the polymer to be granulated and dispersed in the polyol contained in the mixture to form polymer polyol particles. Further, the monomer contained in the mixture may be gradually depleted as the monomer is polymerized into the polyol, that is, polymer polyol particles may be formed in substantially the same manner as addition polymerization.

In step (b1), the monomer, for example, styrene, may be homopolymerized to produce mono-dispersed polystyrene. As described above, when a certain amount of the monomer is homopolymerized first, the amount of produced soluble oligomers may be reduced without using an acrylic monomer as in the prior art.

Independently from the reaction mechanism of the monomer contained in the mixture, the polyol and the monomer as raw materials are not fed into a reactor in a divided or continuous manner in the production of the polymer polyol, but are batchwise fed at a predetermined ratio in step (a). The method of batchwise feeding has an advantage in that the process is simpler than the existing continuous feeding method. Further, in the method of batchwise feeding, the timing of formation of the polymer is unified so that the particles have a mono-dispersed distribution, thereby improving stability.

Meanwhile, in step (a), a surfactant may be further mixed and dispersed to convert the mixture into a water-in-oil type emulsion, or a solvent may be further mixed to disperse the mixture in the solvent. The surfactant may reduce the solubility of the polyol with respect to the monomer or the polymer and improve azeotropic dehydration efficiency during the purification of the polymer polyol. The surfactant may be provided in the form of an aqueous solution, and the concentration of the aqueous solution may be 0.1 to 5 wt %, and preferably, 1 to 3 wt %.

5 to 15 parts by weight of the surfactant or the solvent may be used based on 100 parts by weight of the polyol. When the amount of the used surfactant or solvent is less than 5 parts by weight, the polymer may be excessively polymerized to cause aggregation. When the amount of the used surfactant or solvent is more than 15 parts by weight, the quality of polyurethane foam produced from the polymer polyol may be deteriorated.

The surfactant may be a cationic, anionic or nonionic surfactant.

The cationic surfactant may be one selected from the group consisting of quaternary ammonium compounds, benzalkonium chloride, cetyltrimethylammonium bromide, chitosan, lauryldimethylbenzylammonium chloride, acylcarnitine hydrochloride, alkylpyridinium halides, cetylpyridinium chloride, cationic lipids, polymethylmethacrylate trimethylammonium bromide, sulfonium compounds, polyvinylpyrrolidone-2-dimethylaminoethyl methacrylate dimethylsulfate, hexadecyltrimethylammonium bromide, phosphonium compounds, benzyl-di(2-chloroethyl) ethylammonium bromide, decyl triethyl ammonium chloride, decyl dimethylhydroxyethyl ammonium chloride bromide, ($C_{12}$-$C_{15}$) dimethylhydroxyethylammonium chloride, ($C_{12}$-$C_{15}$) dimethylhydroxyethylammonium chloride bromide, myristyl trimethyl ammonium methyl sulfate, lauryldimethylbenzylammonium chloride, lauryldimethylbenzylammonium bromide, lauryldimethyl (ethenoxy) 4 ammonium chloride, lauryldimethyl(ethenoxy) 4 ammonium bromide, N-alkyl($C_{12}$-$C_{18}$) dimethylbenzylammonium chloride, N-alkyl($C_{14}$-$C_{18}$) dimethyl-benzylammonium chloride, N-tetradecyldimethylbenzylammonium chloride, derivatives thereof and combinations of two or more thereof, but is not limited thereto.

The anionic surfactant may be one selected from the group consisting of ammonium lauryl sulfate, sodium 1-heptanesulfonate, sodium hexanesulfonate, sodium dodecyl sulfate, triethanolammonium dodecylbenzenesulfate, potassium laurate, triethanolamine stearate, lithium dodecyl sulfate, sodium lauryl sulfate, sodium laureth sulfate, sodium cetyl sulfate, sodium thiosulfate, sodium chondroitin sulfate, sodium polyoxyethylene lauryl ether sulfate, alkyl polyoxyethylene sulfate, sodium alginate, dioctyl sodium sulfosuccinate, phosphatidyl glycerol, phosphatidylinositol, phosphatidylserine, phosphatidic acid and salts thereof, glyceryl ester, sodium carboxymethylcellulose, bile acid and salts thereof, cholic acid, deoxycholic acid, glycocholic acid, taurocholic acid, glycodeoxycholic acid, alkyl sulfonates, aryl sulfonates, alkyl phosphates, alkyl phosphonates, stearic acid and salts thereof, calcium stearate, phosphates, carboxymethylcellulose sodium, dioctylsulfosuccinate, dialkyl esters of sodium sulfosuccinic acid, phospholipids and calcium carboxymethylcellulose sodium sulfate, derivatives thereof and combinations of two or more thereof, but is not limited thereto.

The nonionic surfactant may be one selected from the group consisting of methanol, ethanol, isopropanol, butanol, benzyl alcohol, 1,4-butanediol, 1,3-butanediol, 1,2-butanediol, 1,6-hexanediol, 1,2-propanediol, 1,3-propanediol, trimethylolpropane, sorbitol, xylitol, glycerin, diglycerin, ethylene glycol, diethylene glycol, polyethylene glycol, ethylene glycol monomethyl ether, ethylene glycol phenyl ether, propylene glycol, dipropylene glycol, tripropylene glycol, polypropylene glycol, propylene glycol monomethyl ether, propylene glycol phenyl ether, dibutyl diglycol, 3-methyl-3-methoxybutanol, 2-(2-butoxyethoxy) ethanol, polyoxyethylene alkyl ether, polyoxyethylene hydrogenated castor oil, polyoxyethylene sorbitan fatty acid ester, polyoxyethylene fatty alcohol, polyoxyethylene alkyl phenyl ether, derivatives thereof and combinations of two or more thereof, but is not limited thereto.

The solvent may be one selected from the group consisting of toluene, tetrahydrofuran, chloroform, cyclohexane, dioxane, dimethyl sulfoxide, dimethylformamide, acetone, acetonitrile, n-butanol, n-pentanol, chlorobenzene, ethylbenzene, dichloromethane, diethyl ether, tert-butanol, 1,2,-dichloroethylene, diisopropyl ether, ethanol, ethyl acetate, ethyl methyl ketone, heptane, hexane, isopropyl alcohol, isoamyl alcohol, methanol, pentane, n-propyl alcohol, pentachloroethane, 1,1,2,2-tetrachloroethane, 1,1,1-trichloroethane, tetrachlorethylene, tetrachloromethane, trichlorethylene, water, xylene, benzene, nitromethane, and combinations of two or more thereof, and preferably, may be ethyl benzene, isopropyl alcohol or water, but is not limited thereto.

Particularly, the above-described preparation method has an advantage in that, since the polymer polyol may be used with less solvent than an existing method in which 15 parts by weight or more of the solvent is added based on 100 parts by weight of the monomer and the polyol, the generation of VOCs is curbed during preparation of the polymer polyol, and thus it is environmental friendly.

Hereinafter, embodiments of the present invention will be described in more detail. However, the following experimental results are typical experimental results of Examples, and the scope and content of the present invention should not be construed as limited to the exemplary embodiments set forth therein. Each of the effects of various embodiments not specified hereinafter will be described particularly at the corresponding part.

The results of the following experiments are the results of comparative analysis of physical properties of the polymer polyol prepared by the one-pot polymerization process according to an aspect of the present invention and the polymer polyol prepared according to the existing preparation method.

Raw Materials

The following compounds were used as raw materials to prepare a polymer polyol.

Base polyol: polyether polyol
Polymerizable unsaturated monomer: styrene
Polymerization stabilizer: polymerization stabilizer in the form of terminal reactive macromonomer
Polymerization initiator: azobisisobutyronitrile (AIBN)
Chain transfer agent: isopropyl alcohol (IPA)
Additional additives: water and sodium dodecyl sulfate (SDS)

Example 1

1,125 g of styrene as a polymerizable unsaturated monomer and 11.3 g of a polymerization initiator were fed into a 4 L reaction tank equipped with a stirrer and completely dissolved at 25° C. 75 g of a polymerization stabilizer and 1,300 g of a base polyol having a weight average molecular weight ($M_w$) of 3,000 g/mol and a hydroxyl value of 56 were fed into the reaction tank and stirred for 10 minutes.

Thereafter, 150 g of water in which 2.5 g of SDS was dissolved was fed into the reaction tank and stirred for 20 minutes to disperse water droplets. After confirming that all of the water droplets were dispersed and changed into a form in which a transparent single system was emulsified, the temperature of the reaction tank was elevated to 120° C. for 1 hour. Then, polymerization was carried out at 120° C. for 3 hours to prepare a non-purified polymer polyol.

The non-purified polymer polyol was transferred to a purification tank and vacuum degassed at 120 to 140° C. for 12 hours to remove unreacted monomers and additives. As a result, a polymer polyol having 45% polystyrene solids was prepared.

Example 2

The preparation process was performed in the same manner as in Example 1 except that the water containing SDS dissolved therein was not fed.

Example 3

The preparation process was performed in the same manner as in Example 1 except that a base polyol having a weight average molecular weight ($M_w$) of 5,000 g/mol and a hydroxyl value of 34 was used instead of the base polyol.

Example 4

A low-viscosity polymer polyol having 50% polystyrene solids was prepared in the same manner as in Example 1 except that 1,175 g of the base polyol and 1,250 g of styrene as the polymerizable unsaturated monomer were fed.

Example 5

The preparation process was performed in the same manner as in Example 1 except that 150 g of isopropyl alcohol as a chain transfer agent was fed instead of the water in which the SDS was dissolved.

Comparative Example 1

787.5 g of styrene and 337.5 g of acrylonitrile as polymerizable unsaturated monomers and 11.3 g of a polymerization initiator were fed into a 4 L-continuous feed tank equipped with a stirrer and completely dissolved at 25° C. 250 g of a base polyol was fed into the continuous feed tank and stirred for 10 minutes to prepare a continuous feed mixture.

Then, 75 g of a polymerization stabilizer, 1,050 g of a base polyol, and 150 g of isopropyl alcohol as a chain transfer agent were fed into a 4 L reaction tank equipped with a stirrer and dispersed by stirring for 10 minutes. After dispersion was completed, the temperature of the reaction tank was elevated to 120° C. for 1 hour.

The continuous feed mixture was then continuously fed into the reaction tank at a constant speed for 5 hours using a metering pump. After completion of feeding, polymerization was carried out at 120° C. for 1 hour to prepare a non-purified polymer polyol. The non-purified polymer polyol was transferred to a purification tank and vacuum degassed at 140° C. for 12 hours to remove unreacted monomers and the chain transfer agent. As a result, a polymer polyol having 45% SAN solids was prepared.

Comparative Example 2

The preparation process was performed in the same manner as in Comparative Example 1 except that isopropyl alcohol as a chain transfer agent was not fed.

Comparative Example 3

The preparation process was performed in the same manner as in Comparative Example 1 except that water containing SDS dissolved therein was fed instead of isopropyl alcohol as a chain transfer agent.

Comparative Example 4

The preparation process was performed in the same manner as in Comparative Example 1 except that only styrene was fed as the polymerizable unsaturated monomer instead of styrene and acrylonitrile.

Experimental Example 1

The physical properties of the polymer polyols prepared in Examples and Comparative Examples were evaluated, and the results thereof are summarized in the following Table 1.

Referring to Example 5 and Comparative Example 1, when a one-pot polymerization process according to an aspect of the present invention is used, a product having the same quality as that of an existing product can be produced without the phenomenon of rapid change in viscosity even without acrylonitrile which is a polymerizable unsaturated monomer.

Referring to Comparative Examples 2 to 4, it was confirmed that production of a product was impossible since a product was aggregated without acrylonitrile or a chain transfer agent in the existing continuous feed method. It was confirmed that this is also the case when water was used as an additional additive instead of the chain transfer agent.

Experimental Example 2 The polymer polyols prepared according to Example 1 and Comparative Example 1 having

TABLE 1

| Classification | Method of feeding monomer | Polymerizable monomer | Chain transfer agent | Whether or not water was used | Molecular weight of base polyol (g/mol) | Final solid contents (%) | Final viscosity (cps) | Foam hardness (ILD 25) | Elongation (%) |
|---|---|---|---|---|---|---|---|---|---|
| Example 1 | One-pot process | SM | None | ○ | 3,000 | 45 | 5,400 | 40.2 | 54.3 |
| Example 2 | One-pot process | SM | None | X | 3,000 | 45 | 5,200 | 38.3 | 43.7 |
| Example 3 | One-pot process | SM | None | ○ | 5,000 | 45 | 16,000 | 36.5 | 56.8 |
| Example 4 | One-pot process | SM | None | ○ | 3,000 | 50 | 9,500 | 46.4 | 40.4 |
| Example 5 | One-pot process | SM | IPA | X | 3,000 | 45 | 5,200 | 39.8 | 48.5 |
| Comparative Example 1 | Continuous feed method | SM/AN | IPA | X | 3,000 | 45 | 5,100 | 39.5 | 53.2 |
| Comparative Example 2 | Continuous feed method | SM/AN | None | X | 3,000 | 45 | Aggregated | Not evaluable | — |
| Comparative Example 3 | Continuous feed method | SM/AN | None | ○ | 3,000 | 45 | Aggregated | Not evaluable | — |
| Comparative Example 4 | Continuous feed method | SM | IPA | X | 3,000 | 45 | Aggregated | Not evaluable | — |

In Table 1, the one-pot process is a one-pot polymerization process and the continuous feed method is an existing method of preparing a polymer polyol.

The polymerizable monomer is styrene (SM), acrylonitrile (AN), and the chain transfer agent is isopropyl alcohol (IPA).

For the foam hardness, indentation load deflection (ILD 25) is a method for measurement of hardness, in which the polyurethane foam prepared by molding the polymer polyol in a 300×300×100 mm-mold is cured at room temperature for 1 day and then compressed to 25% and the force applied was measured, and the unit thereof is kgf/314 cm². Referring to Table 1, it was confirmed that the physical properties of the polymer polyol prepared according to Example 1 had better foam hardness and elongation than the polymer polyol of Comparative Example 1 according to the existing preparation method.

Referring to Examples 1 to 2, it was confirmed that more excellent foam hardness and elongation were exhibited when water containing SDS dissolved therein was added. This is because the dispersed water droplets lowered the solubility of the base polyol with respect to polystyrene and increased the azeotropic dehydration efficiency during the final purification process.

Figure 2:
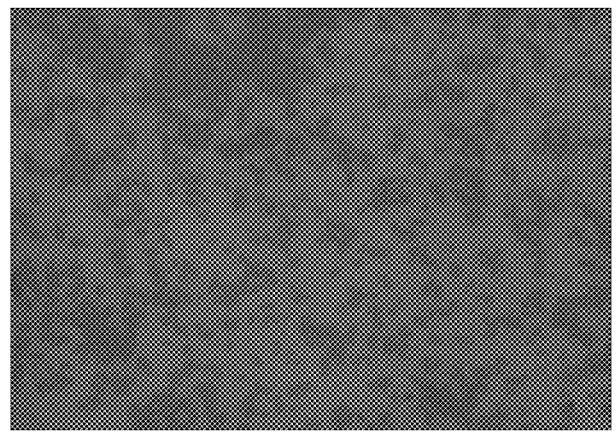
FIG. 2 is an image showing the result of observing a polymer polyol prepared according to Example 1 of the present invention with an optical microscope.
Figure 3:
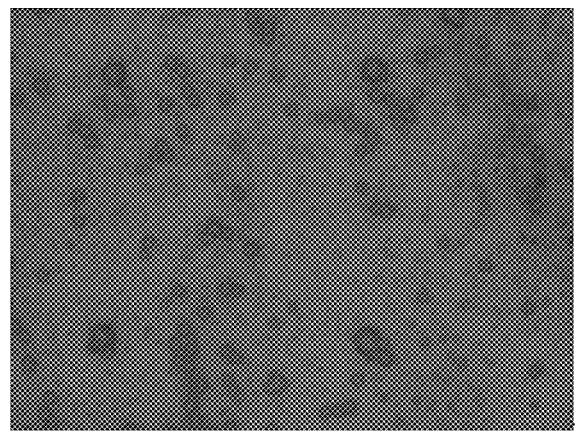
FIG. 3 is an image showing the result of observing a polymer polyol prepared according to Comparative Example 1 of the present invention with an optical microscope.

Referring to Examples 1 and 3, it was confirmed that the higher the weight average molecular weight ($M_w$) of the base polyol, the higher the viscosity and elongation of the final product but the lower the foam hardness.

the same solid content were observed under an optical microscope, and the images are respectively shown in FIGS. 2 and 3.

Referring to FIGS. 2 and 3, it can be seen that the product of Example 1 prepared using the one-pot polymerization process of the present invention has a uniform particle size and exhibits high monodispersibility, while the particles of the product of Comparative Example 1 prepared using the existing continuous feed method exhibit polydispersity.

It can be seen from the above results that polydispersity increases the non-uniformity of the product to cause deterioration in quality such as aggregation of solid contents in the Comparative Examples, whereas the stability of particles is excellent due to high monodispersity so that a polymer polyol can be prepared without aggregation in the Examples in which the one-pot polymerization process was used.

According to an aspect of the present invention, the polyol and the monomer are batchwise fed in a predetermined ratio to prepare a mixture, and then the mixture is polymerized for a certain period of time, whereby monodispersed polymer polyol particles can be prepared efficiently and economically.

Further, according to the above-described method, a polymer polyol having the same quality as that of an existing product can be prepared at low cost through the homopolymerization of styrene, and the use amounts of a solvent, a chain transfer agent and a stabilizer are reduced, and thus it is more eco-friendly compared to the prior art.

Effects of the invention are not limited to the effects mentioned above, and may include every effect capable of being inferred from the description or claims of the present invention.

The above description is only exemplary, and it will be understood by those skilled in the art that the invention may be carried out in other concrete forms without changing the technological scope and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present invention is defined not by the detailed description but by the appended claims, and encompasses all modifications or alterations derived from meanings, the scope and equivalents of the appended claims.

What is claimed is:

1. A method of preparing a polymer polyol, comprising the steps of:
    (a) respectively batchwise feeding a polyol and a styrene monomer in a weight ratio of 40 to 60:40 to 60 into a reactor to prepare a mixture; and
    (b) polymerizing the mixture for 1 to 5 hours to prepare monodispersed particles,
    wherein the step (a) further comprises mixing an aqueous solution including a surfactant and dispersing the aqueous solution to convert the mixture into an emulsion.

2. The method according to claim 1, wherein the polyol is a polyether polyol.

3. The method according to claim 2, wherein the polyether polyol has a weight average molecular weight of 1,000 to 6,000 g/mol.

4. The method according to claim 2, wherein the polyether polyol has a hydroxyl value of 30 to 60 mgKOH/g.

5. The method according to claim 1, wherein the surfactant is a cationic, anionic or nonionic surfactant.

6. The method according to claim 1, wherein a solvent is further mixed to disperse the mixture in the solvent in the step (a).

7. The method according to claim 6, wherein the solvent is one selected from the group consisting of toluene, tetrahydrofuran, chloroform, cyclohexane, dioxane, dimethyl sulfoxide, dimethylformamide, acetone, acetonitrile, n-butanol, n-pentanol, chlorobenzene, ethylbenzene, dichloromethane, diethyl ether, tert-butanol, 1,2,-dichloroethylene, diisopropyl ether, ethanol, ethyl acetate, ethyl methyl ketone, heptane, hexane, isopropyl alcohol, isoamyl alcohol, methanol, pentane, n-propyl alcohol, pentachloroethane, 1,1,2,2-tetrachloroethane, 1,1,1-trichloroethane, tetrachlorethylene, tetrachloromethane, trichlorethylene, water, xylene, benzene, nitromethane, and combinations of two or more thereof.

* * * * *